US008955541B2

(12) United States Patent
Yunxia et al.

(10) Patent No.: US 8,955,541 B2
(45) Date of Patent: Feb. 17, 2015

(54) DISC ASSEMBLY WITH BRANCH HOLE FOR FLUID FLOW CONTROL DEVICE

(71) Applicant: Fisher Regulators (Shanghai) Co., Ltd., Shanghai (CN)

(72) Inventors: Han Yunxia, Shanghai (CN); Sun Yantao, Shanghai (CN); Zhang Qin, Shanghai (CN)

(73) Assignee: Fisher Regulators (Shanghai) Co., Ltd.

( * ) Notice: Subject to any disclaimer, the term of this patent is extended or adjusted under 35 U.S.C. 154(b) by 193 days.

(21) Appl. No.: 13/729,167

(22) Filed: Dec. 28, 2012

(65) Prior Publication Data

US 2014/0174565 A1   Jun. 26, 2014

(30) Foreign Application Priority Data

Dec. 21, 2012  (CN) .......................... 2012 1 0560153
Dec. 21, 2012  (CN) ...................... 2012 2 0712432 U (51) Int. Cl.
| | | |
|---|---|---|
| F16K 31/12 | (2006.01) | |
| F16K 17/04 | (2006.01) | |
| F16K 31/126 | (2006.01) | |
| F16K 1/36 | (2006.01) | |

(52) U.S. Cl.
CPC ............. *F16K 17/04* (2013.01); *F16K 31/1262* (2013.01); *F16K 1/36* (2013.01)
USPC ..................... 137/505.47; 251/175

(58) Field of Classification Search
CPC ....... F16K 1/205; F16K 1/2285; F16K 17/04; F16K 25/02; G05D 16/0694
USPC ............. 137/505.47; 251/170–172, 175, 190, 251/191, 366, 332, 358
See application file for complete search history.

(56) References Cited

U.S. PATENT DOCUMENTS 1,191,481 A * 7/1916 Scoville .......................... 137/238
1,971,713 A * 8/1934 Greve ............................ 251/172
(Continued)

FOREIGN PATENT DOCUMENTS

CN  2374711 Y   4/2000
CN  2434483 Y   6/2001
(Continued)

OTHER PUBLICATIONS

Notification of Transmittal of the International Search Report and The Written Opinion of the International Searching Authority, International Application No. PCT/CN2013/090118, mailing date of Mar. 27, 2014.

*Primary Examiner* — Craig Schneider
*Assistant Examiner* — Jessica Cahill
(74) *Attorney, Agent, or Firm* — Marshall, Gerstein & Borun LLP (57) ABSTRACT

A disc assembly for a fluid flow control device includes an annular disc member, a disc holder, a relief bore, at least one branch passage, and an annular recess formed in the disc holder. The relief bore is formed in a first side of the disc holder along a central axis of the assembly. The annular recess is formed in the first side of the disc holder and is disposed coaxially with the relief bore for accommodating at least a portion of the annular disc member. The at least one branch passage is formed in the disc holder and provides fluid communication between the relief bore and the annular recess such that during use pressurized fluid that accumulates in the annular recess between the disc member and the disc holder can be relieved through the relief bore via the branch passage.

30 Claims, 4 Drawing Sheets

(56) References Cited

U.S. PATENT DOCUMENTS

| | | | | |
|---|---|---|---|---|
| 1,983,797 | A | * | 12/1934 | Greve ............................ 251/172 |
| 3,409,269 | A | * | 11/1968 | Fawkes ......................... 251/175 |
| 4,063,709 | A | * | 12/1977 | Lorthiois ....................... 251/173 |
| 4,192,484 | A | * | 3/1980 | Scaramucci ................... 251/173 |
| 4,511,150 | A | * | 4/1985 | Seguenot ....................... 277/345 |
| 5,119,858 | A | * | 6/1992 | Dartnall .................. 137/516.25 |
| 2009/0261281 | A1 | * | 10/2009 | Mevius et al. ................ 251/118 |

FOREIGN PATENT DOCUMENTS

| | | |
|---|---|---|
| CN | 102691800 A | 9/2012 |
| CN | 203098900 U | 7/2013 |
| DE | 102008050922 A1 | 6/2010 |
| EP | 1114958 A2 | 7/2001 |

\* cited by examiner

DISC ASSEMBLY WITH BRANCH HOLE FOR FLUID FLOW CONTROL DEVICE

CROSS-REFERENCE TO RELATED APPLICATIONS

Priority is claimed to Chinese Patent Application Nos. 201210560153.2 and 201220712432.1, filed Dec. 21, 2012, the entire contents of each of which are expressly incorporated herein by reference.

FIELD OF THE DISCLOSURE

The present disclosure is directed to a disc assembly for a fluid flow control device and, more particularly, to a disc assembly of a control element for a fluid regulator.

BACKGROUND

The pressure at which typical gas distribution systems supply gas may vary according to the demands placed on the system, the climate, the source of supply, and/or other factors. However, most end-user facilities equipped with gas appliances such as furnaces, ovens, etc., require the gas to be delivered in accordance with a predetermined pressure and at or below a maximum capacity of a gas regulator. Therefore, gas regulators are implemented into these distribution systems to ensure that the delivered gas meets the requirements of the end-user facilities. Conventional gas regulators generally include a closed-loop control actuator for sensing and controlling the pressure of the delivered gas.

Figure 1:
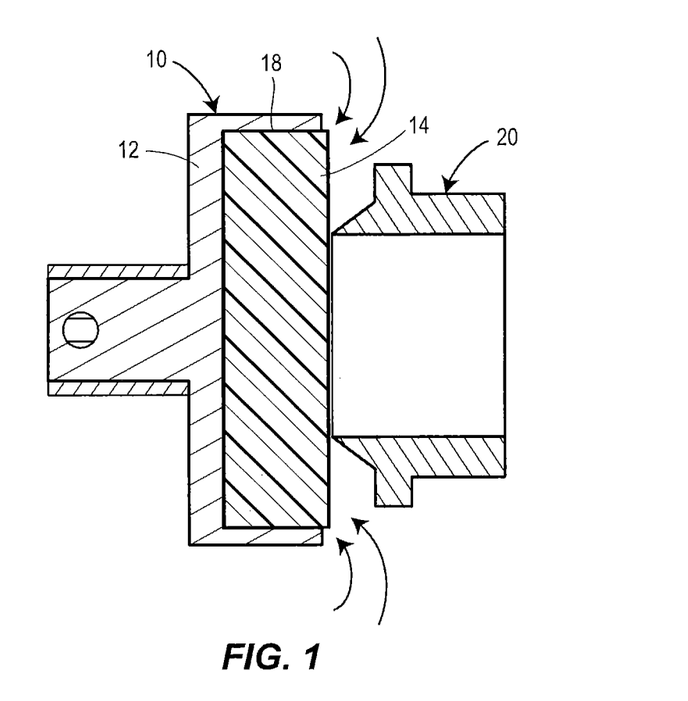
FIG. 1. is side cross-sectional side view of one conventional disc assembly positioned relative to a valve port of a fluid regulator, for example.

Various operating parameters such as temperature and pressure can affect the overall useful life of any number of regulator components. For example, as shown in FIG. 1, control elements for conventional regulators can typically include a disc assembly 10 for opening and closing the regulator valve port 20, thereby adjusting the flow of gas provided to the downstream user. A conventional disc assembly 10 includes a metal disc holder 12 that accommodates a rubber disc member 14, which serve to provide a fluid tight seal with the regulator valve port 20 in the closed position.

Figure 2:
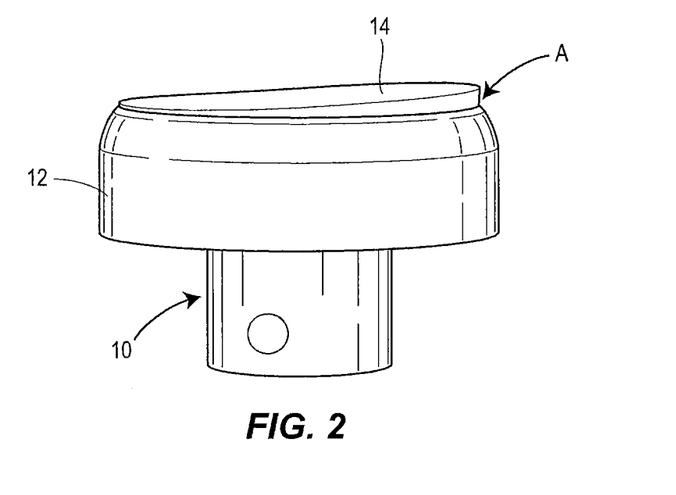
FIG. 2 is a side perspective view of the conventional disc assembly of FIG. 1 illustrating the disc member in a partially pushed out configuration, which can result from use in high temperature applications.

Under high operating temperatures (e.g., 80° C. and above), however, these conventional disc assemblies 10 can be more susceptible to wear and tear. For example, at higher operating temperatures, the rubber disc member 14 can be more prone to physical deformation especially under high pressures (e.g., 150 psi and above), whereas the steel disc holder 12 remains undistorted. As illustrated with the arrows in FIG. 1, it is possible that the higher pressure fluid in these situations to penetrate any gap 18 between the outer circumference of the disc member 14 and the inner wall of the disc holder 12. This pressure can ultimately accumulate behind the disc member 14. Accordingly, when the disc assembly 10 opens and moves away from the valve port 20, the accumulated pressure can at least partially push the disc member 14 out of its intended position. FIG. 2 illustrates one possible result with a side edge portion A of the disc member 14 advanced out of the disc holder 12 relative to the remainder of the disc member 14. This ultimately results in the sealing face of the disc member 14 being disposed at an angle relative to the valve port 20, which can affect the intended operation of the device.

SUMMARY

One aspect of the present disclosure provides a fluid flow control device including a valve body and an actuator. The valve body has an inlet, an outlet, and a valve port disposed between the inlet and the outlet. The actuator is coupled to the valve body for controlling the flow of fluid from the inlet to the outlet via the valve port and has a disc assembly and a diaphragm operably coupled to the disc assembly. The disc assembly is disposed in the valve body and adapted for displacement relative to the valve port in response to pressure changes sensed by the diaphragm. The disc assembly includes an annular disc member, a cylindrical disc holder, a relief bore, an annular recess, and at least one branch passage. The cylindrical disc holder has a fist side facing toward the valve port and a second side facing away from the valve port. The relief bore is formed in the first side of the disc holder along a central axis of the disc holder. The annular recess is formed in the first side of the disc holder and is disposed coaxially with the relief bore and accommodating at least a portion of the annular disc member. The at least one branch passage is formed in the disc holder and provides fluid communication between the relief bore and the annular recess, such that any pressurized fluid in the valve body that accumulates the annular recess between the annular disc member and the disc holder can be relieved through the relief bore via the branch passage.

Another aspect of the present disclosure provides a disc assembly that includes an annular disc member, a cylindrical disc holder, a relief bore, an annular recess, and at least one branch passage. The cylindrical disc holder has a fist side facing toward the valve port and a second side facing away from the valve port. The relief bore is formed in the first side of the disc holder along a central axis of the disc holder. The annular recess is formed in the first side of the disc holder and is disposed coaxially with the relief bore and accommodating at least a portion of the annular disc member. The at least one branch passage is formed in the disc holder and provides fluid communication between the relief bore and the annular recess, such that any pressurized fluid in the valve body that accumulates the annular recess between the annular disc member and the disc holder can be relieved through the relief bore via the branch passage.

Still another aspect of the present disclosure provides a disc assembly for a fluid flow control device including a disc member, a disc holder, a recess, and at least one fluid passageway. The disc holder has a fist side and a second side. The recess is formed in the first side of the disc holder and accommodates at least a portion of the disc member. The at least one fluid passageway is formed in the disc holder and extends between the recess and an outer surface of the disc holder such that during use pressurized fluid that accumulates in the recess between the disc member and the disc holder can be relieved through the fluid passageway.

DETAILED DESCRIPTION

The present disclosure is directed to a disc assembly and a fluid flow control device equipped with a disc assembly, wherein the disc assembly is designed and configured to minimize and/or prevent pressure accumulation behind the disc member in the disc holder. In one version of the disc assembly described below, this is achieved by providing the disc holder with a fluid passageway (e.g., a relief bore) that is in fluid communication with a backside of the disc member. So configured, any pressure accumulated behind the disc member can be relieved through the fluid passageway without forcing the disc member out of its intended position relative to the disc holder.

Figure 3:
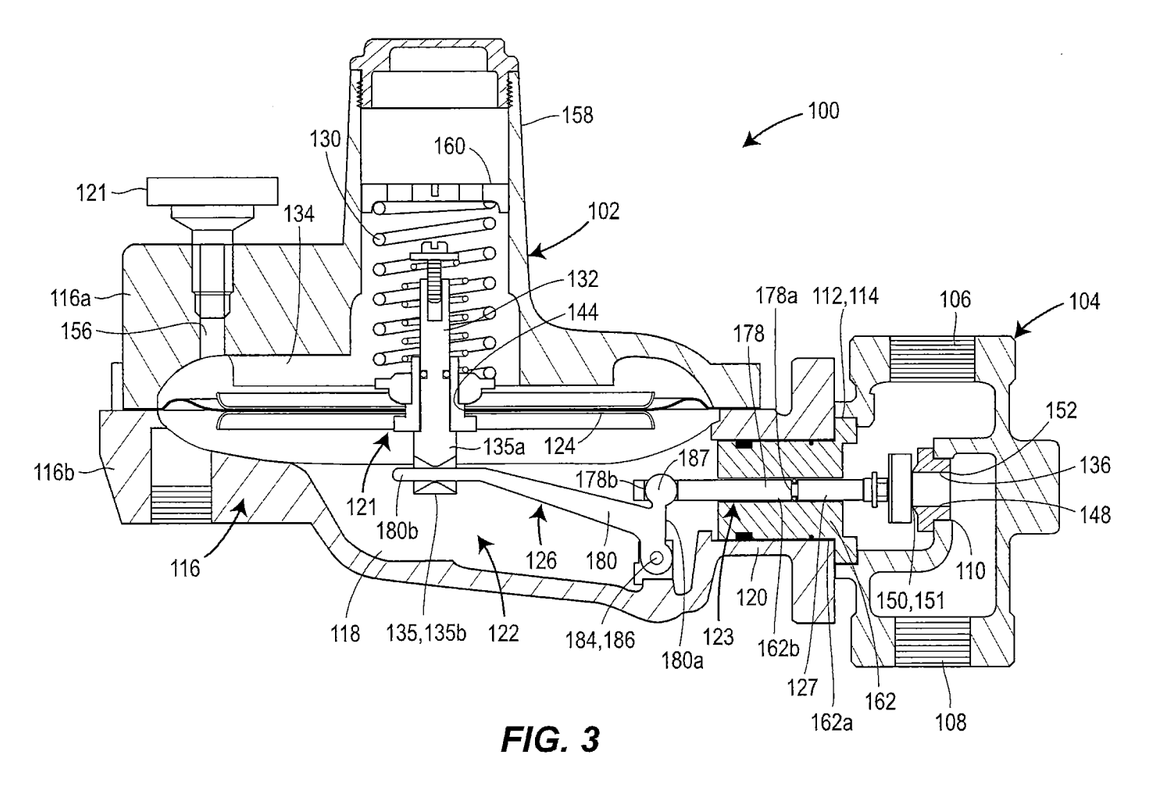
FIG. 3 is a side cross-sectional side view of one example of a fluid flow control device including a disc assembly constructed in accordance with the principles of the present disclosure.

Referring now to the Figures, FIG. 3 depicts a gas regulator 100 constructed in accordance with one example of the present disclosure. The gas regulator 100 generally comprises an actuator 102 and a regulator valve 104. The regulator valve 104 includes an inlet 106 for receiving gas from a gas distribution system, for example, and an outlet 108 for delivering gas to a facility having one or more appliances, for example. The actuator 102 is coupled to the regulator valve 104 and includes a control assembly 122 having a control element 127 equipped with a disc assembly 200 constructed in accordance with the present disclosure. During a first or normal operational mode, the control assembly 122 senses the pressure at the outlet 108 of the regulator valve 104, i.e., the outlet pressure, via an external piping arrangement, for example, and controls a position of the control element 127 such that the outlet pressure approximately equals a predetermined control pressure. Additionally, upon the occurrence of a failure in the system, the regulator 100 can perform a relief function by way, of an exhaust style relief valve 121, as known in the art.

With continued reference to FIG. 3, the regulator valve 104 defines a throat 110 and a valve mouth 112. The valve mouth 112 defines an opening 114 disposed along an axis that is generally perpendicular to an axis of the inlet 106 and the outlet 108. The throat 110 is disposed between the inlet 106 and the outlet 108, and accommodates a valve port 136. The valve port 136 includes an inlet 150, an outlet 152, and an elongated orifice 148 extending between the inlet 150 and the outlet 152. Gas must travel through the orifice 148 in the valve port 136 to travel between the inlet 106 and the outlet 108 of the regulator valve 104. In the depicted version, the inlet 150 further defines a seat ring 151, against which the disc assembly 200 of the control element 127 engages when in a closed position. The disc assembly 200, as shown, resides within the regulator valve 104 at a position between the outlet 108 and the valve port 136 throughout operation of the device 100.

Figure 4:
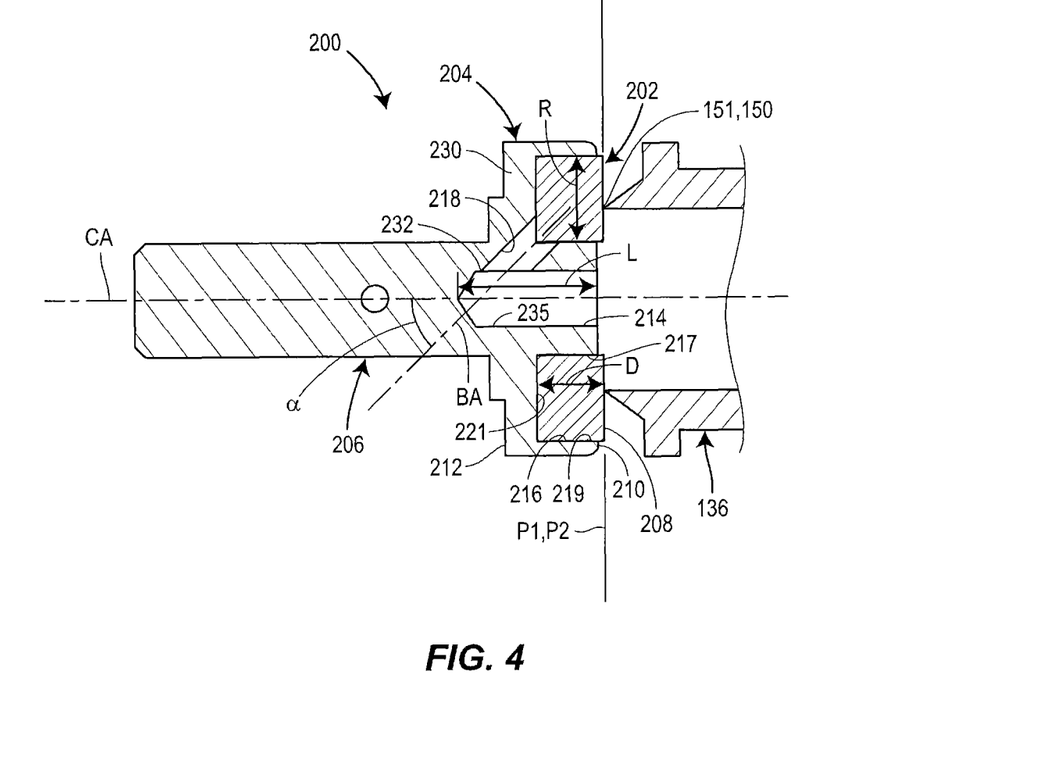
FIG. 4 is a side cross-sectional side view of one example of the disc assembly of FIG. 3.

FIG. 4 depicts the disc assembly 200 of FIG. 3 in more detail. The disc assembly 200 includes a disc member 202, a disc holder 204, and a pin 206, all positioned coaxially on a central axis CA of the disc assembly 202. As shown, the disc member 202 includes an annular disc member having a generally square or rectangular cross-sectional profile. The disc member 202 can be constructed of an elastomeric material, a rubber material, or any other material suitable for any given intended application. As shown, the disc member 202 includes a generally planar seating surface 208 that is adapted to seat against the seat ring 151 of the valve port 136 of the regulator 100 depicted in FIG. 3, for example. In the disclosed example, the seating surface 208 and the seat ring 151 are disposed in parallel planes P1, P2, respectively, such that the seating surface 208 can provide a reliable seal with the seat ring 151. So configured, when the disc member 202 is in the closed position depicted in FIG. 4, the parallel planes P1, P2 are co-planar.

Still referring to FIG. 4, the disc holder 204 of the disc assembly 200 includes a cylindrical shaped member constructed of a metal material such as stainless steel, for example. As illustrated, the disc holder 204 includes a first side 210 facing the valve port 136 in FIG. 4 and, more particularly, the inlet 150 of the valve port 136, and a second side 212 facing away from the valve port 136. The pin 206 of the disc assembly 200 is attached to and extends away from the second side 212 of the disc holder 202 and, as depicted in FIG. 3, is adapted to be coupled to the control element 127 of a fluid flow control device.

The disc holder 204 further defines a relief bore 214, an annular recess 216, and at least one branch recess 218. In the disclosed example, the relief bore 214 and annular recess 216 are each formed in the first side 210 of the disc holder 204. In other versions, however, the relief bore 214 could be formed in the second side 212 of the disc holder 204, as will be discussed below. The annular recess 216 of the disc holder 204 in FIG. 4 is sized and configured to accommodate at least a portion of the disc member 202, as shown. Accordingly, in the depicted example, the annular recess 216 includes a square or rectangular cross-sectional profile that resembles the square or rectangular cross-sectional profile of the disc member 202. More specifically, the cross-sectional profile of the annular recess 216 in FIG. 4 includes an inner cylindrical surface 217, an outer cylindrical surface 219, and a radial surface 221 extending between the inner and outer surfaces 217, 219. The radial surface 221, and therefore the annular recess 216, has a radial dimension R. Each of the inner and outer cylindrical surfaces 217, 219, and therefore the annular recess 216, has a depth dimension D.

In the version depicted in FIG. 4, the radial dimension R of the annular recess 216 can be slightly larger than a corresponding dimension of the disc member 202, while the depth dimension D of the annular recess 216 can be slightly smaller than a corresponding dimension of the disc member 202. This configuration facilitates insertion of the disc member 202 into the annular recess 216 during assembly while also allowing a portion of the disc member 202 adjacent to the seating surface 208 to be exposed outside of the recess 216. In such a configuration, an adhesive or some other fastener, for example, can be used to assist with retaining the disc member 202 in the annular recess 216. In other examples, the cross-sectional profiles of the annular recess 216 and disc member 202 can have identical dimensions. In still further examples, a radial dimension R of the cross-sectional profile of the annular recess 216 can be slightly smaller than a corresponding dimension of the disc member 202, thereby facilitating a friction fit with the disc member 202. Such a friction fit could optionally eliminate the use of adhesive or another fastener to retain the disc member 202 in the annular recess 216.

As mentioned, the disc holder 204 of the presently disclosed disc assembly 200 further includes the relief bore 214 and the branch passage 218, which in combination can be referred herein as a fluid passageway. The relief bore 214 includes a cylindrical blind bore formed in the first side of the disc holder 204 at a location along the central axis CA of the disc assembly 200 and has a depth dimension L that is larger than the depth dimension D of the annular recess 216. So configured, the annular recess 216 and disc member 202 of the presently disclosed disc assembly 200 surround at least a portion of the relief bore 214 that is disposed adjacent to the first side 210 of the disc holder 204.

The branch passage 218 of the present version includes a cylindrical through-bore that provides fluid communication between the relief bore 214 and annular recess 216. As depicted, the branch passage 218 is formed in the disc holder 204 along a branch axis BA that is disposed at an angle α relative to the central axis CA of the disc assembly 200. In one example, the angle α can be approximately 40°. However, the angle α of the branch passage 218 can be generally any angle suitable for the intended purpose. For example, the angle α could be any angle between approximately 5° and approximately 90° or between approximately 30° and approximately 60°.

As illustrated in FIG. 4, the branch passage 218 of the presently disclosed version of the disc assembly 200 includes a first end 230 communicating with the annular recess 216 and a second end 232 communicating with the relief bore 214. The second end 232 of the branch passage 218, as shown, simply breaks through or penetrates a sidewall 235 of the relief bore 214. The first end 230 intersects the annular recess 216 at a location where the inner cylindrical wall 217 intersects the radial wall 221 of the annular recess 216. As such, the branch passage 218 of the presently disclosed version actually breaks through or penetrates to the annular recess 216 at a portion of the inner cylindrical wall 217 and at a portion of the radial wall 221 of the annular recess 216. In other examples, however, the first end 230 of the branch passage 218 could break through or penetrate into the annular recess 216 through only the radial wall 221 or only the inner cylindrical wall 217.

As mentioned above, the disc assembly 200 of the present disclosure includes at least one branch passage 218 extending between the annular recess 216 and the relief bore 214. Thus, although FIG. 4 only depicts a single branch passage 218, an alternative version of the disc assembly 200 in FIG. 4 can have a plurality of branch passages 218. Each of the plurality of branch passages 218 can be configured generally identical to that depicted in FIG. 4 and spaced circumferentially about the relief bore 214. In other versions, some of the plurality of branch passages 218 could be configured different from others. For example, one version of the disc assembly 200 could include a plurality of branch passages 218 that have first ends 230 that break through or penetrate the annular recess 216 only through the radial wall 221 and another plurality of branch passages 218 that break through or penetrate the annular recess 216 only through the inner cylindrical wall 217. Other configurations of course can be utilized and are within the scope of this disclosure.

Figure 5:
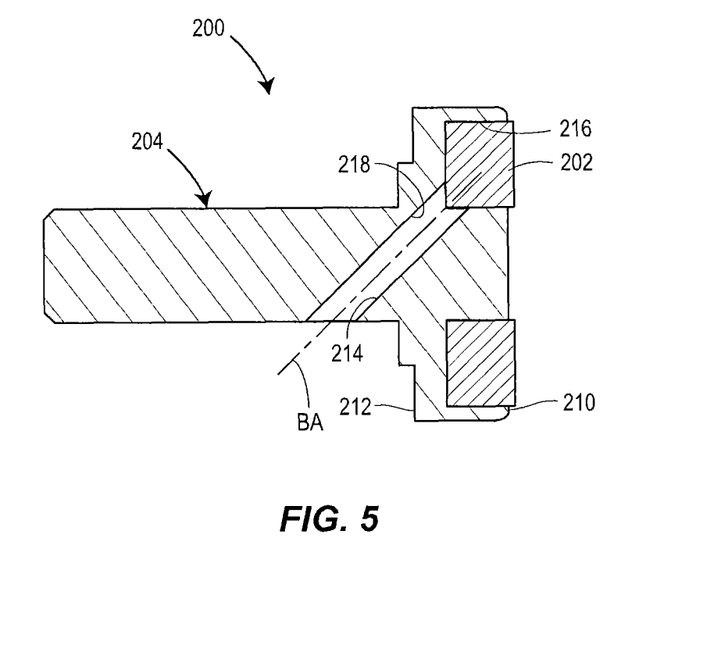
FIG. 5 is a cross-sectional side view of an alternative disc assembly constructed in accordance with the present disclosure.

Still further, while the relief bore 214 of the version of the disc assembly 200 in FIG. 4 has been described and depicted as being formed in the first side 210 of the disc holder 202, other versions of the disc assembly 200 can include the relief bore 214 formed in the second side 212 or even through a perimeter sidewall of the disc holder 204. In one version constructed in accordance with this alternative version, and shown in FIG. 5, the relief bore 214 could simply be an extension of the branch passage 218 such that the relief bore 214 extends away from the branch passage 218 and annular recess 216, yet along the branch axis BA, through the second side 212 of the disc holder 204, and ultimately out of the sidewall of the pin 206, for example. In still a further version of the disc assembly 200 depicted in FIG. 5, the disc member 202 and recess 216 could be cylindrical rather than annular because the relief bore 214 has been displaced to the second side 212 of the holder 204. Other variations are of course intended to be within the scope of this disclosure.

Regardless of which version of relief bore 214 and/or branch passage 218 is provided, the disc assembly 200 of the present disclosure is arranged and configured to relieve any fluid pressure that might otherwise accumulate in the annular recess 216 behind the disc member 202. Specifically, under various operating conditions, when the disc assembly 200 occupies a closed position, as depicted in FIG. 4, inlet fluid pressure surrounding the disc assembly 200 can penetrate the disc holder 204 between the disc member and the outer cylindrical wall 219 of the annular recess 216. In some instances, such pressure can further penetrate between the disc member 202 and the radial wall 217 of the annular recess 216. In the event that this pressure penetration occurs, the fluid follows the path of least resistance and naturally flows to the branch passage 218 and immediately to the relief bore 214, where it can be exhausted out of the disc holder 204. As such, it can be said that the branch passage 218 and relief bore 214 in combination define a fluid passageway formed in the disc holder 204 of the present disclosure. This pressure relief function helps ensure that the disc member 202 is firmly retained in the annular recess 216 in its desired position and minimizes or eliminates the possibility that the fluid pressure will force the disc member 202 out of the disc holder 204. This is especially advantageous when used in the fluid regulator 100 depicted in FIG. 3 under high pressure (e.g., greater than or equal to 150 psi) and high temperature (e.g., greater than or equal to 80° C.) conditions.

For the sake of completeness, additional structural and operational details of the regulator 100 in FIG. 3 will be provided. As mentioned, the regulator 100 includes the actuator 102 and the regulator valve 104. The actuator 102 includes a housing 116 and the control assembly 122. The housing 116 includes an upper housing component 116a and a lower housing component 116b secured together with a plurality of fasteners, for example. The lower housing component 116b defines a control cavity 118 and an actuator mouth 120. The actuator mouth 120 is connected to the valve mouth 112 of the regulator valve 104 to provide fluid communication between the actuator 102 and the regulator valve 104. The upper housing component 116a defines a relief cavity 134 and an exhaust port 156. The upper housing component 116a further defines a tower portion 158 for accommodating a portion of the control assembly 122, as will be described.

The control assembly 122 includes a diaphragm subassembly 121 and the control element 127. The diaphragm subassembly 121 generally includes a diaphragm 124, a piston 132, and a control spring 130. More particularly, the diaphragm 124 includes a disc-shaped diaphragm defining an opening 144 through a central portion thereof. The diaphragm 124 is constructed of a flexible, substantially air-tight, material and its periphery is sealingly secured between the upper and lower housing components 116a, 116b of the housing 116. The diaphragm 124 therefore separates the relief cavity 134 from the control cavity 118.

The piston 132 of the disclosed embodiment includes a generally elongated rod-shaped member having a coupler 135 which connects to a portion of the disc subassembly 123 to enable attachment between the diaphragm subassembly 121 and the disc subassembly 123, as will be described.

The control spring 130 is disposed on top of the diaphragm 124 and within the tower portion 158 of the upper housing component 116a. A control spring seat 160 is threaded into the tower portion 158 and compresses the control spring 130. In the disclosed embodiment, the control spring 130 includes a compression coil spring. Accordingly, the control spring 130 is grounded against the upper housing component 116a and applies a downward force to the diaphragm 124. In the disclosed embodiment, the force generated by the control spring 130 is adjustable by adjusting the position of the control spring seat 160 in the tower portion 158, and therefore the control pressure of the regulator 100 is also adjustable.

The control spring 130 acts against the pressure in the control cavity 118, which is sensed by the diaphragm 124. As stated, this pressure is the same pressure as that which exists at the outlet 108 of the regulator valve 104. Accordingly, the force applied by the control spring 130 sets the outlet pressure to a desired, or control pressure for the regulator 100. The diaphragm subassembly 121 is operably coupled to the disc subassembly 123, as mentioned above, via the coupler 135.

Specifically, the disc subassembly 123 includes a control arm 126 and a stem guide 162. The control arm 126 includes a stem 178, a lever 180, and the control element 127. The control element 127 of the disclosed embodiment includes the disc assembly 200 described in detail above.

The stem 178, lever 180, and disc assembly 200 are constructed separately and assembled to form the control arm 126. Specifically, the stem 178 is a generally linear rod having a nose 178a and a recess 178b, which in the disclosed embodiment is generally rectangular. The lever 180 is a slightly curved rod and includes a fulcrum end 180a and a free end 180b. The fulcrum end 180a includes an aperture 184 receiving a pivot pin 186 carried by the lower housing component 116b. The fulcrum end 180a also includes a knuckle 187 having an elliptical cross-section and disposed within the recess 178b of the stem 178. The free end 180b is received between a top portion 135a and a bottom portion 135b of the coupler 135 of the piston 132. Thus, the coupler 135 operably connects the disc subassembly 123 to the diaphragm subassembly 121.

The stem guide 162 includes a generally cylindrical outer portion 162a and a generally cylindrical inner portion 162b. The outer portion 162a of the stem guide 162 is sized and configured to fit within the mouths 112, 120 of the regulator valve 104 and lower housing component 116b, respectively. The inner portion 162b is sized and configured to slidably retain the stem 178 of the control arm 126. Thus, the stem guide 162 serves to maintain the alignment of the regulator valve 104, the actuator housing 116, and the control assembly 122, and more particularly, the stem 178 of the control arm 126 of the control assembly 122.

FIG. 3 depicts the regulator 100 of the present disclosure with the disc assembly 200 in a closed position. Therefore, the disc assembly 200 sealingly engages the seat ring 151 at the inlet 150 of the valve port 136. So configured, gas does not flow through the valve port 136 and the regulator valve 104. This configuration is achieved because the outlet pressure, which corresponds to the pressure in the control cavity 118 of the housing 116 and sensed by the diaphragm 124, is greater than the force applied by the control spring 130. Accordingly, the outlet pressure forces the diaphragm 124, the piston 132, and the disc assembly 200 into the closed position. In this closed position, pressure within the regulator valve 104 surrounding the disc assembly 200, under certain conditions, can penetrate the disc assembly 200, as discussed above with reference to FIG. 4, for example. Advantageously, however, the relief bore 214 and branch passage 218 ensure that such pressure penetration does not detrimentally affect the construct of the disc assembly 200.

In the event that an operating demand is placed on the gas distribution system, e.g., a user begins operating an appliance such as a furnace, a stove, etc., the appliance draws gas flow from the control cavity 118 of the regulator 100, thereby reducing the pressure that is sensed by the diaphragm 124. As the pressure sensed by the diaphragm 124 decreases, a force imbalance occurs between a control spring force and an outlet pressure force on the diaphragm 124 such that the control spring 130 expands and displaces the diaphragm 124 and piston 132 downward, relative to the housing 116. This causes the lever 180 to pivot in the clockwise direction about the pivot pin 186, which, in turn, rotates the knuckle 187 relative to the recess 178b in the stem 178. This moves the stem 178 and the disc assembly 200 away from the seat ring 151 at the inlet 150 of the valve port 136 to open the regulator valve 104.

So configured, the gas distribution system is adapted to deliver gas to the downstream appliance through the regulator valve 104 at a control pressure that is set by the control spring 130. Additionally, the diaphragm subassembly 121 continues to sense the outlet pressure of the regulator valve 104. As long as the outlet pressure remains approximately equal to the control pressure, the control assembly 122 will keep the disc assembly 200 in this same general position. However, if the outlet flow, i.e., the demand, decreases, thereby increasing the outlet pressure above the control pressure set by the control spring 130, the diaphragm 124 senses the increased outlet pressure and moves upward against the bias of the control spring 130. Alternatively, if the outlet flow, i.e., the demand, increases, thereby decreasing the outlet pressure below the control pressure, the diaphragm 124 senses the decreased outlet pressure and the spring 130 biases the diaphragm 124 and piston 132 downward to open the regulator valve 104. Thus, slight deviations from the outlet or control pressure causes the control assembly 122 to react and adjust the position of the disc assembly 200 accordingly.

In view of the foregoing, the disclosed disc assembly 200 and regulator 100 equipped with the disc assembly 200 can advantageously operate with a high degree of accuracy and increased longevity under many operating conditions including those with high pressures and temperatures that would have compromised the integrity of prior art disc assemblies. This high degree of accuracy is achievable by eliminating any detrimental effect of accumulate pressure behind the disc member. This is further advanced by the fact that the disc member 202 of the present disclosure is annular in shape such that it has a smaller cross-sectional area than the conventional disc member depicted in FIGS. 1 and 2, for example. That is, instead of having a circular cross-sectional area, the surface of the disc member 202 of the present disclosure that faces the radial wall 221 of the recess 216 of the disc holder 204 is annular or ring-shaped. This smaller area reduces the available area against which pressure accumulation can act, thereby also reducing the potential effects thereof. While the disc member 202 of the present disclosure has been described as being annular in shape, with slight modifications, the pressure relief concepts disclosed herein can be equally applicable to cylindrically shaped disc members such as that disclosed in FIGS. 1 and 2. For example, the version depicted in FIG. 5 could easily be modified to include a cylindrical, as opposed to an annular, disc member.

The foregoing description is intended to be merely exemplary of the invention and not intended to limit the invention beyond that which is defined by the following claims.

We claim:

1. A fluid flow control device, comprising:
a valve body comprising an inlet, an outlet, and a valve port disposed between the inlet and the outlet; and
an actuator coupled to the valve body for controlling the flow of fluid from the inlet to the outlet via the valve port, the actuator comprising a disc assembly and a diaphragm operably coupled to the disc assembly, the disc assembly disposed in the valve body and adapted for displacement relative to the valve port in response to pressure changes sensed by the diaphragm, the disc assembly comprising:

an annular disc member, a cylindrical disc holder having a first side facing toward the valve port and a second side facing away from the valve port, a relief bore formed in the first side of the disc holder along a central axis of the disc holder, an annular recess formed in the first side of the disc holder, the annular recess disposed coaxially with the relief bore and accommodating at least a portion of the annular disc member, and at least one branch passage formed in the disc holder and providing fluid communication between the relief bore and the annular recess, such that any pressurized fluid in the valve body that accumulates in the annular recess between the annular disc member and the disc holder can be relieved through the relief bore via the branch passage.

2. The device of claim 1, wherein the disc assembly is disposed in the valve body between the inlet and the valve port.

3. The device of claim 1, wherein the relief bore comprises a blind bore and the at least one branch passage comprises at least one through-bore extended between the annular recess and the relief bore.

4. The device of claim 1, wherein the at least one branch passage comprises a plurality of branch passages.

5. The device of claim 1, wherein the disc assembly further comprises a pin extending from the second side of the disc holder and being operably coupled to the diaphragm.

6. The device of claim 1, wherein the annular disc member comprises an elastomeric material and the disc holder comprises a metal material.

7. The device of claim 1, wherein the annular disc member comprises a rubber material and the disc holder comprises a stainless steel material.

8. The device of claim 1, wherein the at least one branch passage extends at an angle relative to the central axis of the disc holder.

9. The device of claim 8, wherein the angle of the branch passage is between approximately five degrees and approximately ninety degrees relative to the central axis of the disc holder.

10. The device of claim 9, wherein the angle of the branch passage is between approximately thirty degrees and approximately sixty degrees relative to the central axis of the disc holder.

11. A disc assembly for a fluid flow control device, the disc assembly comprising:

an annular disc member;

a cylindrical disc holder having a first side and a second side;

a relief bore formed in the first side of the disc holder along a central axis of the disc holder;

an annular recess formed in the first side of the cylindrical disc holder, the annular recess disposed coaxially with the relief bore and accommodating at least a portion of the annular disc member; and at least one branch passage formed in the disc holder and providing fluid communication between the relief bore and the annular recess, such that during use pressurized fluid that accumulates in the annular recess between the annular disc member and the disc holder can be relieved through the relief bore via the branch passage.

12. The assembly of claim 11, wherein the relief bore comprises a blind bore and the at least one branch passage comprises at least one through-bore extended between the annular recess and the relief bore.

13. The assembly of claim 11, wherein the at least one branch passage comprises a plurality of branch passages.

14. The assembly of claim 11, further comprising a pin extending from the second side of the disc holder for being coupled to an actuator assembly of a fluid flow control device.

15. The assembly of claim 11, wherein the annular disc member comprises an elastomeric material and the disc holder comprises a metal material.

16. The assembly of claim 11, wherein the annular disc member comprises a rubber material and the disc holder comprises a stainless steel material.

17. The assembly of claim 11, wherein the branch passage extends at an angle relative to the central axis of the disc holder.

18. The assembly of claim 17, wherein the angle of the branch passage is between approximately five degrees and approximately ninety degrees relative to the central axis of the disc holder.

19. The assembly of claim 18, wherein the angle of the branch passage is between approximately thirty degrees and approximately sixty degrees relative to the central axis of the disc holder.

20. A disc assembly for a fluid flow control device, the disc assembly comprising:

a disc holder having a first side, a second side, and a central axis, the first side comprising a planar circular surface disposed on the central axis;

an annular recess formed about the central axis in the planar circular surface of the first side of the disc holder;

an annular disc member having a planar sealing surface, at least a portion of the annular disc member being disposed about the central axis in the annular recess such that the planar sealing surface is disposed in a plane that is parallel to a plane occupied by the planar circular surface of the first side of the disc holder;

a pin extending from the second side of the disc holder along the central axis; and at least one fluid passageway formed in the disc holder and extending between the recess and an outer surface of the disc holder such that during use pressurized fluid that accumulates in the recess between the disc member and the disc holder can be relieved through the fluid passageway.

21. The assembly of claim 20, wherein the fluid passageway comprises a relief bore and a branch passage in fluid communication with the relief bore, wherein the branch passage extends from the recess formed in the disc holder to the relief bore and the relief bore extends from the branch passage and out of an outer surface of the disc holder.

22. The assembly of claim 20, wherein the fluid passageway extends from the recess and out of the first side of the disc holder.

23. The assembly of claim 20, wherein the at least one fluid passageway comprises a plurality of fluid passageways.

24. The assembly of claim 20, further comprising a pin extending from the second side of the disc holder for being coupled to an actuator assembly of a fluid flow control device.

25. The assembly of claim 20, wherein the disc member comprises an elastomeric material and the disc holder comprises a metal material.

26. The assembly of claim 20, wherein the annular disc member comprises a rubber material and the disc holder comprises a stainless steel material.

27. The assembly of claim 21, wherein the relief bore includes a blind bore that extends from the first side of the disc holder along a central axis of the assembly.

28. The assembly of claim 27, wherein the branch passage includes a through-bore that extends from the recess to the relief bore at an angle relative to the central axis of the assembly.

29. The assembly of claim 28, wherein the angle of the branch passage is between approximately five degrees and approximately ninety degrees relative to the central axis of the disc holder.

30. The assembly of claim 29, wherein the angle of the branch passage is between approximately thirty degrees and approximately sixty degrees relative to the central axis of the disc holder.

\* \* \* \* \*

UNITED STATES PATENT AND TRADEMARK OFFICE
CERTIFICATE OF CORRECTION

PATENT NO. : 8,955,541 B2  
APPLICATION NO. : 13/729167  
DATED : February 17, 2015  
INVENTOR(S) : Han Yunxia et al.

Page 1 of 1

It is certified that error appears in the above-identified patent and that said Letters Patent is hereby corrected as shown below:

In the Specification:

At Column 2, line 55, "FIG. 1. is side" should be -- FIG. 1 is a side --.

At Column 3, line 37, "way," should be -- way --.

Signed and Sealed this  
First Day of March, 2016

Michelle K. Lee  
*Director of the United States Patent and Trademark Office*